United States Patent
Collins et al.

(10) Patent No.: US 12,504,287 B2
(45) Date of Patent: *Dec. 23, 2025

(54) AVATAR BASED ON TRIP

(71) Applicant: Snap Inc., Santa Monica, CA (US)

(72) Inventors: Alexander Collins, Santa Monica, CA (US); Benedict Copping, Los Angeles, CA (US); Justin Huang, Los Angeles, CA (US); Alexander Vodovoz, Inglewood, CA (US)

(73) Assignee: Snap Inc., Santa Monica, CA (US)

( * ) Notice: Subject to any disclaimer, the term of this patent is extended or adjusted under 35 U.S.C. 154(b) by 389 days.

This patent is subject to a terminal disclaimer.

(21) Appl. No.: 18/112,317

(22) Filed: Feb. 21, 2023

(65) Prior Publication Data

US 2023/0204367 A1 Jun. 29, 2023

Related U.S. Application Data

(63) Continuation of application No. 15/929,393, filed on Apr. 30, 2020, now Pat. No. 11,619,501.
(Continued)

(51) Int. Cl.
*G01C 21/34* (2006.01)
*G01C 21/36* (2006.01)
(Continued)

(52) U.S. Cl.
CPC ......... *G01C 21/343* (2013.01); *G01C 21/367* (2013.01); *G01C 21/3694* (2013.01); *G06T 13/40* (2013.01); *G06T 13/60* (2013.01)

(58) Field of Classification Search
None
See application file for complete search history.

(56) References Cited

U.S. PATENT DOCUMENTS

| 666,223 A | 1/1901 | Shedlock |
| 4,581,634 A | 4/1986 | Williams |
| (Continued) |

FOREIGN PATENT DOCUMENTS

| CA | 2887596 A1 | 7/2015 |
| CN | 109863532 A | 6/2019 |
| (Continued) |

OTHER PUBLICATIONS

"A Whole New Story", Snap, Inc., [Online] Retrieved from the Internet: <URL: https://www.snap.com/en-US/news/>, (2017), 13 pgs.
(Continued)

*Primary Examiner* — William L Bashore
*Assistant Examiner* — Koorosh Nehchiri
(74) *Attorney, Agent, or Firm* — Schwegman Lundberg & Woessner, P.A.

(57) ABSTRACT

Aspects of the present disclosure involve a system comprising a computer-readable storage medium storing a program and a method for generating an avatar based on trip information. The program and method include determining that one or more criteria associated with a user correspond to a trip taken by the user during a given time interval; retrieving a plurality of media generated by a client device of the user during the given time interval; automatically selecting a plurality of avatar customizations to represent the trip based on the plurality of media generated by the user during the given time interval; automatically generating a trip-based avatar for the user based on the plurality of avatar customizations; and causing display of the trip-based avatar.

20 Claims, 10 Drawing Sheets

Related U.S. Application Data

(60) Provisional application No. 62/988,078, filed on Mar. 11, 2020.

(51) Int. Cl.
  *G06T 13/40* (2011.01)
  *G06T 13/60* (2011.01)

(56) References Cited

U.S. PATENT DOCUMENTS

| | | | |
|---|---|---|---|
| 4,975,690 A | 12/1990 | Torres | |
| 5,072,412 A | 12/1991 | Henderson, Jr. et al. | |
| 5,493,692 A | 2/1996 | Theimer et al. | |
| 5,713,073 A | 1/1998 | Warsta | |
| 5,754,939 A | 5/1998 | Herz et al. | |
| 5,855,008 A | 12/1998 | Goldhaber et al. | |
| 5,880,731 A | 3/1999 | Liles et al. | |
| 5,883,639 A | 3/1999 | Walton et al. | |
| 5,999,932 A | 12/1999 | Paul | |
| 6,012,098 A | 1/2000 | Bayeh et al. | |
| 6,014,090 A | 1/2000 | Rosen et al. | |
| 6,023,270 A | 2/2000 | Brush, II et al. | |
| 6,029,141 A | 2/2000 | Bezos et al. | |
| 6,038,295 A | 3/2000 | Mattes | |
| 6,049,711 A | 4/2000 | Yehezkel et al. | |
| 6,154,764 A | 11/2000 | Nitta et al. | |
| 6,167,435 A | 12/2000 | Druckenmiller et al. | |
| 6,204,840 B1 | 3/2001 | Petelycky et al. | |
| 6,205,432 B1 | 3/2001 | Gabbard et al. | |
| 6,216,141 B1 | 4/2001 | Straub et al. | |
| 6,223,165 B1 | 4/2001 | Lauffer | |
| 6,285,381 B1 | 9/2001 | Sawano et al. | |
| 6,285,987 B1 | 9/2001 | Roth et al. | |
| 6,310,694 B1 | 10/2001 | Okimoto et al. | |
| 6,317,789 B1 | 11/2001 | Rakavy et al. | |
| 6,334,149 B1 | 12/2001 | Davis, Jr. et al. | |
| 6,349,203 B1 | 2/2002 | Asaoka et al. | |
| 6,353,170 B1 | 3/2002 | Eyzaguirre et al. | |
| 6,446,004 B1 | 9/2002 | Cao et al. | |
| 6,449,657 B2 | 9/2002 | Stanbach et al. | |
| 6,456,852 B2 | 9/2002 | Bar et al. | |
| 6,484,196 B1 | 11/2002 | Maurille | |
| 6,487,601 B1 | 11/2002 | Hubacher et al. | |
| 6,523,008 B1 | 2/2003 | Avrunin | |
| 6,542,749 B2 | 4/2003 | Tanaka et al. | |
| 6,549,768 B1 | 4/2003 | Fraccaroli | |
| 6,618,593 B1 | 9/2003 | Drutman et al. | |
| 6,622,174 B1 | 9/2003 | Ukita et al. | |
| 6,631,463 B1 | 10/2003 | Floyd et al. | |
| 6,636,247 B1 | 10/2003 | Hamzy et al. | |
| 6,636,855 B2 | 10/2003 | Holloway et al. | |
| 6,643,684 B1 | 11/2003 | Malkin et al. | |
| 6,658,095 B1 | 12/2003 | Yoakum et al. | |
| 6,665,531 B1 | 12/2003 | Soderbacka et al. | |
| 6,668,173 B2 | 12/2003 | Greene | |
| 6,684,238 B1 | 1/2004 | Dutta | |
| 6,684,257 B1 | 1/2004 | Camut et al. | |
| 6,698,020 B1 | 2/2004 | Zigmond et al. | |
| 6,700,506 B1 | 3/2004 | Winkler | |
| 6,720,860 B1 | 4/2004 | Narayanaswami | |
| 6,724,403 B1 | 4/2004 | Santoro et al. | |
| 6,725,259 B1 * | 4/2004 | Bharat | G06F 16/9538 709/219 |
| 6,757,713 B1 | 6/2004 | Ogilvie et al. | |
| 6,772,195 B1 | 8/2004 | Hatlelid et al. | |
| 6,832,222 B1 | 12/2004 | Zimowski | |
| 6,834,195 B2 | 12/2004 | Brandenberg et al. | |
| 6,836,792 B1 | 12/2004 | Chen | |
| 6,842,779 B1 | 1/2005 | Nishizawa | |
| 6,898,626 B2 | 5/2005 | Ohashi | |
| 6,959,324 B1 | 10/2005 | Kubik et al. | |
| 6,970,088 B2 | 11/2005 | Kovach | |
| 6,970,907 B1 | 11/2005 | Ullmann et al. | |
| 6,980,909 B2 | 12/2005 | Root et al. | |
| 6,981,040 B1 | 12/2005 | Konig et al. | |
| 7,020,494 B2 | 3/2006 | Spriestersbach et al. | |
| 7,027,124 B2 | 4/2006 | Foote et al. | |
| 7,072,963 B2 | 7/2006 | Anderson et al. | |
| 7,085,571 B2 | 8/2006 | Kalhan et al. | |
| 7,110,744 B2 | 9/2006 | Freeny, Jr. | |
| 7,124,164 B1 | 10/2006 | Chemtob | |
| 7,149,893 B1 | 12/2006 | Leonard et al. | |
| 7,173,651 B1 | 2/2007 | Knowles | |
| 7,188,143 B2 | 3/2007 | Szeto | |
| 7,203,380 B2 | 4/2007 | Chiu et al. | |
| 7,206,568 B2 | 4/2007 | Sudit | |
| 7,227,937 B1 | 6/2007 | Yoakum et al. | |
| 7,237,002 B1 | 6/2007 | Estrada et al. | |
| 7,240,089 B2 | 7/2007 | Boudreau | |
| 7,269,426 B2 | 9/2007 | Kokkonen et al. | |
| 7,280,658 B2 | 10/2007 | Amini et al. | |
| 7,315,823 B2 | 1/2008 | Brondrup | |
| 7,342,587 B2 | 3/2008 | Danzig et al. | |
| 7,349,768 B2 | 3/2008 | Bruce et al. | |
| 7,356,564 B2 | 4/2008 | Hartselle et al. | |
| 7,394,345 B1 | 7/2008 | Ehlinger et al. | |
| 7,411,493 B2 | 8/2008 | Smith | |
| 7,423,580 B2 | 9/2008 | Markhovsky et al. | |
| 7,454,442 B2 | 11/2008 | Cobleigh et al. | |
| 7,468,729 B1 | 12/2008 | Levinson | |
| 7,508,419 B2 | 3/2009 | Toyama et al. | |
| 7,512,649 B2 | 3/2009 | Faybishenko et al. | |
| 7,519,670 B2 | 4/2009 | Hagale et al. | |
| 7,535,890 B2 | 5/2009 | Rojas | |
| 7,546,554 B2 | 6/2009 | Chiu et al. | |
| 7,607,096 B2 | 10/2009 | Oreizy et al. | |
| 7,636,755 B2 | 12/2009 | Blattner et al. | |
| 7,639,251 B2 | 12/2009 | Gu et al. | |
| 7,639,943 B1 | 12/2009 | Kalajan | |
| 7,650,231 B2 | 1/2010 | Gadler | |
| 7,668,537 B2 | 2/2010 | DeVries | |
| 7,770,137 B2 | 8/2010 | Forbes et al. | |
| 7,775,885 B2 | 8/2010 | Van Luchene et al. | |
| 7,778,973 B2 | 8/2010 | Choi | |
| 7,779,444 B2 | 8/2010 | Glad | |
| 7,787,886 B2 | 8/2010 | Markhovsky et al. | |
| 7,796,946 B2 | 9/2010 | Eisenbach | |
| 7,801,954 B2 | 9/2010 | Cadiz et al. | |
| 7,856,360 B2 | 12/2010 | Kramer et al. | |
| 7,859,551 B2 | 12/2010 | Bulman et al. | |
| 7,885,931 B2 | 2/2011 | Seo et al. | |
| 7,925,703 B2 | 4/2011 | Dinan et al. | |
| 8,001,204 B2 | 8/2011 | Burtner et al. | |
| 8,032,586 B2 | 10/2011 | Challenger et al. | |
| 8,082,255 B1 | 12/2011 | Carlson, Jr. et al. | |
| 8,088,044 B2 | 1/2012 | Tchao et al. | |
| 8,090,351 B2 | 1/2012 | Klein | |
| 8,095,878 B2 | 1/2012 | Bates et al. | |
| 8,098,904 B2 | 1/2012 | Ioffe et al. | |
| 8,099,109 B2 | 1/2012 | Altman et al. | |
| 8,108,774 B2 | 1/2012 | Finn et al. | |
| 8,112,716 B2 | 2/2012 | Kobayashi | |
| 8,117,281 B2 | 2/2012 | Robinson et al. | |
| 8,130,219 B2 | 3/2012 | Fleury et al. | |
| 8,131,597 B2 | 3/2012 | Hudetz | |
| 8,135,166 B2 | 3/2012 | Rhoads | |
| 8,136,028 B1 | 3/2012 | Loeb et al. | |
| 8,146,001 B1 | 3/2012 | Reese | |
| 8,146,005 B2 | 3/2012 | Jones et al. | |
| 8,151,191 B2 | 4/2012 | Nicol | |
| 8,161,115 B2 | 4/2012 | Yamamoto | |
| 8,161,417 B1 | 4/2012 | Lee | |
| 8,195,203 B1 | 6/2012 | Tseng | |
| 8,199,747 B2 | 6/2012 | Rojas et al. | |
| 8,208,943 B2 | 6/2012 | Petersen | |
| 8,214,443 B2 | 7/2012 | Hamburg | |
| 8,234,350 B1 | 7/2012 | Gu et al. | |
| 8,276,092 B1 | 9/2012 | Narayanan et al. | |
| 8,279,319 B2 | 10/2012 | Date | |
| 8,280,406 B2 | 10/2012 | Ziskind et al. | |
| 8,285,199 B2 | 10/2012 | Hsu et al. | |
| 8,287,380 B2 | 10/2012 | Nguyen et al. | |
| 8,301,159 B2 | 10/2012 | Hamynen et al. | |
| 8,306,922 B1 | 11/2012 | Kunal et al. | |

(56) References Cited

U.S. PATENT DOCUMENTS

| | | | |
|---|---|---|---|
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,384,719 B2 | 2/2013 | Reville et al. |
| 8,385,950 B1 | 2/2013 | Wagner et al. |
| RE44,054 E | 3/2013 | Kim |
| 8,396,708 B2 | 3/2013 | Park et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,425,322 B2 | 4/2013 | Gillo et al. |
| 8,458,601 B2 | 6/2013 | Castelli et al. |
| 8,462,198 B2 | 6/2013 | Lin et al. |
| 8,471,914 B2 | 6/2013 | Sakiyama et al. |
| 8,472,935 B1 | 6/2013 | Fujisaki |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,559,980 B2 | 10/2013 | Pujol |
| 8,560,612 B2 | 10/2013 | Kilmer et al. |
| 8,564,621 B2 | 10/2013 | Branson et al. |
| 8,564,710 B2 | 10/2013 | Nonaka et al. |
| 8,566,329 B1 * | 10/2013 | Freed .............. G06F 16/24578 707/913 |
| 8,581,911 B2 | 11/2013 | Becker et al. |
| 8,594,680 B2 | 11/2013 | Ledlie et al. |
| 8,597,121 B2 | 12/2013 | del Valle |
| 8,601,051 B2 | 12/2013 | Wang |
| 8,601,379 B2 | 12/2013 | Marks et al. |
| 8,613,089 B1 | 12/2013 | Holloway et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,683,354 B2 | 3/2014 | Khandelwal et al. |
| 8,692,830 B2 | 4/2014 | Nelson et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,890,926 B2 | 11/2014 | Tandon et al. |
| 8,892,999 B2 | 11/2014 | Nims et al. |
| 8,909,679 B2 | 12/2014 | Root et al. |
| 8,909,725 B1 | 12/2014 | Sehn |
| 8,924,250 B2 | 12/2014 | Bates et al. |
| 8,963,926 B2 | 2/2015 | Brown et al. |
| 8,972,357 B2 | 3/2015 | Shim et al. |
| 8,989,786 B2 | 3/2015 | Feghali |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,086,776 B2 | 7/2015 | Ye et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,105,014 B2 | 8/2015 | Collet et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B1 | 9/2015 | Ebsen et al. |
| 9,152,477 B1 | 10/2015 | Campbell et al. |
| 9,191,776 B2 | 11/2015 | Root et al. |
| 9,204,252 B2 | 12/2015 | Root |
| 9,225,897 B1 | 12/2015 | Sehn et al. |
| 9,241,184 B2 | 1/2016 | Weerasinghe |
| 9,256,860 B2 | 2/2016 | Herger et al. |
| 9,258,459 B2 | 2/2016 | Hartley |
| 9,298,257 B2 | 3/2016 | Hwang et al. |
| 9,314,692 B2 | 4/2016 | Konoplev et al. |
| 9,330,483 B2 | 5/2016 | Du et al. |
| 9,344,606 B2 | 5/2016 | Hartley et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,385,983 B1 | 7/2016 | Sehn |
| 9,396,354 B1 | 7/2016 | Murphy et al. |
| 9,402,057 B2 | 7/2016 | Kaytaz et al. |
| 9,407,712 B1 | 8/2016 | Sehn |
| 9,407,816 B1 | 8/2016 | Sehn |
| 9,412,192 B2 | 8/2016 | Mandel et al. |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,460,541 B2 | 10/2016 | Li et al. |
| 9,489,661 B2 | 11/2016 | Evans et al. |
| 9,489,760 B2 | 11/2016 | Li et al. |
| 9,491,134 B2 | 11/2016 | Rosen et al. |
| 9,503,845 B2 | 11/2016 | Vincent |
| 9,508,197 B2 | 11/2016 | Quinn et al. |
| 9,532,171 B2 | 12/2016 | Allen et al. |
| 9,537,811 B2 | 1/2017 | Allen et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,628,950 B1 | 4/2017 | Noeth et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,710,821 B2 | 7/2017 | Heath |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,854,219 B2 | 12/2017 | Sehn |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |

(56) References Cited

U.S. PATENT DOCUMENTS

| | | |
|---|---|---|
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 10,674,311 B1 | 6/2020 | Bouba et al. |
| 10,893,385 B1 | 1/2021 | Berardino et al. |
| 10,936,066 B1 | 3/2021 | Jaureguiberry et al. |
| 10,939,246 B1 | 3/2021 | Dancie et al. |
| 10,945,098 B2 | 3/2021 | Dancie et al. |
| 11,032,670 B1 | 6/2021 | Baylin et al. |
| 11,039,270 B2 | 6/2021 | Bouba et al. |
| 11,166,123 B1 | 11/2021 | Guillaume |
| 11,275,439 B2 | 3/2022 | Jaureguiberry et al. |
| 11,294,936 B1 | 4/2022 | Jaureguiberry |
| 11,307,747 B2 | 4/2022 | Dancie et al. |
| 11,619,501 B2 | 4/2023 | Collins et al. |
| 2002/0047868 A1 | 4/2002 | Miyazawa |
| 2002/0067362 A1 | 6/2002 | Agostino Nocera et al. |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2002/0169644 A1 | 11/2002 | Greene |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0162419 A1 | 7/2005 | Kim et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0206610 A1 | 9/2005 | Cordelli |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0142944 A1* | 6/2006 | Orwant .................. G01W 1/10 702/3 |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2006/0294465 A1 | 12/2006 | Ronen et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0113181 A1 | 5/2007 | Blattner et al. |
| 2007/0136228 A1 | 6/2007 | Petersen |
| 2007/0168863 A1 | 7/2007 | Blattner et al. |
| 2007/0176921 A1 | 8/2007 | Iwasaki et al. |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0062141 A1 | 3/2008 | Chandhri |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158222 A1 | 7/2008 | Li et al. |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0016617 A1 | 1/2009 | Bregman-Amitai et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0055484 A1 | 2/2009 | Vuong et al. |
| 2009/0058822 A1 | 3/2009 | Chaudhri |
| 2009/0070688 A1 | 3/2009 | Gyorfi et al. |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0099925 A1 | 4/2009 | Mehta et al. |
| 2009/0106672 A1 | 4/2009 | Burstrom |

(56) References Cited

U.S. PATENT DOCUMENTS

| | | |
|---|---|---|
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0158170 A1 | 6/2009 | Narayanan et al. |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0177976 A1 | 7/2009 | Bokor et al. |
| 2009/0192900 A1 | 7/2009 | Collision |
| 2009/0199242 A1 | 8/2009 | Johnson et al. |
| 2009/0202114 A1 | 8/2009 | Morin et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265604 A1 | 10/2009 | Howard et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0300525 A1 | 12/2009 | Jolliff et al. |
| 2009/0303984 A1 | 12/2009 | Clark et al. |
| 2009/0319607 A1 | 12/2009 | Belz et al. |
| 2009/0327073 A1 | 12/2009 | Li |
| 2009/0327889 A1* | 12/2009 | Jeong .................. G06F 16/954 715/706 |
| 2010/0011422 A1 | 1/2010 | Mason et al. |
| 2010/0023885 A1 | 1/2010 | Reville et al. |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0115426 A1 | 5/2010 | Liu et al. |
| 2010/0130233 A1 | 5/2010 | Parker |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0203968 A1 | 8/2010 | Gill et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0227682 A1 | 9/2010 | Reville et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0093780 A1 | 4/2011 | Dunn |
| 2011/0102630 A1 | 5/2011 | Rukes |
| 2011/0115798 A1 | 5/2011 | Nayar et al. |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0148864 A1 | 6/2011 | Lee et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0239136 A1 | 9/2011 | Goldman et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113106 A1 | 5/2012 | Choi et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0130717 A1 | 5/2012 | Xu et al. |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |

(56) References Cited

U.S. PATENT DOCUMENTS

| | | |
|---|---|---|
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0103760 A1 | 4/2013 | Golding et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194280 A1* | 8/2013 | Kwon ............... G06T 15/00 345/473 |
| 2013/0194301 A1 | 8/2013 | Robbins et al. |
| 2013/0198176 A1 | 8/2013 | Kim |
| 2013/0201187 A1 | 8/2013 | Tong et al. |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0249948 A1 | 9/2013 | Reitan |
| 2013/0257877 A1 | 10/2013 | Davis |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0043329 A1 | 2/2014 | Wang et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0055554 A1 | 2/2014 | Du et al. |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0125678 A1 | 5/2014 | Wang et al. |
| 2014/0129343 A1 | 5/2014 | Finster et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0309788 A1* | 10/2014 | Blum ............... H04W 4/029 700/276 |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0169827 A1 | 6/2015 | Laborde |
| 2015/0172534 A1 | 6/2015 | Miyakawa et al. |
| 2015/0178260 A1 | 6/2015 | Brunson |
| 2015/0206349 A1 | 7/2015 | Rosenthal et al. |
| 2015/0222814 A1 | 8/2015 | Li et al. |
| 2015/0261917 A1 | 9/2015 | Smith |
| 2015/0312184 A1 | 10/2015 | Langholz et al. |
| 2015/0350136 A1 | 12/2015 | Flynn, III et al. |
| 2015/0363640 A1* | 12/2015 | Meyer ............... G06Q 10/10 382/224 |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0025507 A1* | 1/2016 | Bai ............... G06Q 10/02 701/400 |
| 2016/0057188 A1 | 2/2016 | Padmanabhan et al. |
| 2016/0066155 A1* | 3/2016 | Fan ............... G06F 3/0484 455/457 |
| 2016/0085773 A1 | 3/2016 | Chang et al. |
| 2016/0085863 A1 | 3/2016 | Allen et al. |
| 2016/0099901 A1 | 4/2016 | Allen et al. |
| 2016/0110355 A1* | 4/2016 | Charania ............ G06F 16/51 382/224 |
| 2016/0125635 A1* | 5/2016 | Nam ............... A63F 13/58 715/764 |
| 2016/0134840 A1 | 5/2016 | Mcculloch |
| 2016/0180887 A1 | 6/2016 | Sehn |
| 2016/0182422 A1 | 6/2016 | Sehn et al. |
| 2016/0182875 A1 | 6/2016 | Sehn |

(56) References Cited

U.S. PATENT DOCUMENTS

| | | | |
|---|---|---|---|
| 2016/0234149 A1 | 8/2016 | Tsuda et al. | |
| 2016/0239248 A1 | 8/2016 | Sehn | |
| 2016/0277419 A1 | 9/2016 | Allen et al. | |
| 2016/0321708 A1 | 11/2016 | Sehn | |
| 2017/0006094 A1 | 1/2017 | Abou Mahmoud et al. | |
| 2017/0061308 A1 | 3/2017 | Chen et al. | |
| 2017/0080346 A1 | 3/2017 | Abbas | |
| 2017/0087473 A1 | 3/2017 | Siegel et al. | |
| 2017/0113140 A1 | 4/2017 | Blackstock et al. | |
| 2017/0118145 A1 | 4/2017 | Aittoniemi et al. | |
| 2017/0199855 A1 | 7/2017 | Fishbeck | |
| 2017/0235848 A1 | 8/2017 | Van Deusen et al. | |
| 2017/0287006 A1 | 10/2017 | Azmoodeh et al. | |
| 2017/0310934 A1 | 10/2017 | Du et al. | |
| 2017/0312634 A1 | 11/2017 | Ledoux et al. | |
| 2017/0339162 A1* | 11/2017 | Singh | G06Q 50/01 |
| 2018/0047200 A1 | 2/2018 | O'hara et al. | |
| 2018/0068019 A1* | 3/2018 | Novikoff | G06F 16/7867 |
| 2018/0113587 A1 | 4/2018 | Allen et al. | |
| 2018/0115503 A1 | 4/2018 | Baldwin et al. | |
| 2018/0315076 A1 | 11/2018 | Andreou | |
| 2018/0315133 A1 | 11/2018 | Brody et al. | |
| 2018/0315134 A1 | 11/2018 | Amitay et al. | |
| 2019/0001223 A1 | 1/2019 | Blackstock et al. | |
| 2019/0057616 A1 | 2/2019 | Cohen et al. | |
| 2019/0188920 A1 | 6/2019 | Mcphee et al. | |
| 2020/0125575 A1 | 4/2020 | Ghoshal et al. | |
| 2020/0314586 A1 | 10/2020 | Bouba et al. | |
| 2020/0382912 A1 | 12/2020 | Dancie et al. | |
| 2020/0401225 A1 | 12/2020 | Jaureguiberry et al. | |
| 2021/0011612 A1 | 1/2021 | Dancie et al. | |
| 2021/0152979 A1 | 5/2021 | Berardino et al. | |
| 2021/0266704 A1 | 8/2021 | Dancie et al. | |
| 2021/0285774 A1 | 9/2021 | Collins et al. | |
| 2021/0377693 A1 | 12/2021 | Bouba et al. | |
| 2021/0409904 A1 | 12/2021 | Baylin et al. | |
| 2022/0122309 A1* | 4/2022 | Kim | G06T 7/70 |
| 2022/0174455 A1 | 6/2022 | Guillaume | |
| 2022/0269345 A1 | 8/2022 | Jaureguiberry et al. | |

FOREIGN PATENT DOCUMENTS

| | | |
|---|---|---|
| CN | 110168478 A | 8/2019 |
| EP | 2051480 A1 | 4/2009 |
| EP | 2151797 A1 | 2/2010 |
| EP | 2184092 A2 | 5/2010 |
| GB | 2399928 A | 9/2004 |
| JP | 2001230801 A | 8/2001 |
| JP | 5497931 B2 | 3/2014 |
| KR | 19990073076 A | 10/1999 |
| KR | 20010078417 A | 8/2001 |
| KR | 101445263 B1 | 9/2014 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2003094072 A1 | 11/2003 |
| WO | WO-2004095308 A1 | 11/2004 |
| WO | WO-2006107182 A1 | 10/2006 |
| WO | WO-2006118755 A2 | 11/2006 |
| WO | WO-2007092668 A2 | 8/2007 |
| WO | WO-2007134402 A1 | 11/2007 |
| WO | WO-2009043020 A2 | 4/2009 |
| WO | WO-2011040821 A1 | 4/2011 |
| WO | WO-2011119407 A1 | 9/2011 |
| WO | WO-2012139276 A1 | 10/2012 |
| WO | WO-2013008238 A1 | 1/2013 |
| WO | WO-2013027893 A1 | 2/2013 |
| WO | WO-2013045753 A1 | 4/2013 |
| WO | WO-2013152454 A1 | 10/2013 |
| WO | WO-2013166588 A1 | 11/2013 |
| WO | WO-2014006129 A1 | 1/2014 |
| WO | WO-2014031899 A1 | 2/2014 |
| WO | WO-2014068573 A1 | 5/2014 |
| WO | WO-2014115136 A1 | 7/2014 |
| WO | WO-2014194262 A2 | 12/2014 |
| WO | WO-2014194439 A1 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016090605 A1 | 6/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2016179166 A1 | 11/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |

OTHER PUBLICATIONS

"Adding photos to your listing", eBay, [Online] Retrieved from the Internet: <URL: http://pages.ebay.com/help/sell/pictures.html>, (accessed May 24, 2017), 4 pgs.

"U.S. Appl. No. 15/929,393, Final Office Action mailed Oct. 14, 2022", 24 pgs.

"U.S. Appl. No. 15/929,393, Non Final Office Action mailed Jun. 6, 2022", 23 pgs.

"U.S. Appl. No. 15/929,393, Notice of Allowance mailed Dec. 21, 2022", 5 pgs.

"U.S. Appl. No. 15/929,393, Response filed Sep. 2, 2022 to Non Final Office Action mailed Jun. 6, 2022", 10 pgs.

"U.S. Appl. No. 15/929,393, Response filed Dec. 2, 2022 to Final Office Action mailed Oct. 14, 2022", 11 pgs.

"BlogStomp", StompSoftware, [Online] Retrieved from the Internet: <URL: http://stompsoftware.com/blogstomp>, (accessed May 24, 2017), 12 pgs.

"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.

"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.

"InstaPlace Photo App Tell The Whole Story", [Online] Retrieved from the Internet: <URL: youtu.be/uF_gFkg1hBM>, (Nov. 8, 2013), 113 pgs., 1:02 min.

"International Application Serial No. PCT/US2015/037251, International Search Report mailed Sep. 29, 2015", 2 pgs.

"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.

"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.

"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.

"Starbucks Cup Magic", [Online] Retrieved from the Internet: <URL: https://www.youtube.com/watch?v=RWwQXi9RG0w>, (Nov. 8, 2011), 87 pgs.; 00:47 min.

"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.

"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.

(56) References Cited

OTHER PUBLICATIONS

"Surprise!", [Online] Retrieved from the Internet: <URL: https://www.snap.com/en-US/news/post/surprise>, (Oct. 3, 2013), 1 pg.
Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.
Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.
Etherington, Darrell, "Snapchat Gets Its Own Timeline With Snapchat Stories, 24-Hour Photo & Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.
Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.
Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.
Macleod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.
Macleod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.
Notopoulos, Katie, "A Guide To The New Snapchat Filters And Big Fonts", [Online] Retrieved from the Internet: <URL: https://www.buzzfeed.com/katienotopoulos/a-guide-to-the-new-snapchat-filters-and-big-fonts?utm_term =.bkQ9qVZWe#.nv58YXpkV>, (Dec. 22, 2013), 13 pgs.
Panzarino, Matthew, "Snapchat Adds Filters, A Replay Function And For Whatever Reason, Time, Temperature And Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.
Tripathi, Rohit, "Watermark Images in PHP And Save File on Server", [Online] Retrieved from the Internet: <URL: http://code.rohitink.com/2012/12/28/watermark-images-in-php-and-save-file-on-server>, (Dec. 28, 2012), 4 pgs.
"OpenStreetMap powers map data on thousands of web sites, mobile apps, and hardware devices", [Online]. 1 Retrieved from the Internet: <URL: https://web.archive.org/web/20200310022149/https://www.openstreetmap.org/about/> (Archived on Mar. 10, 2020), 1 pg.

\* cited by examiner

AVATAR BASED ON TRIP

CLAIM OF PRIORITY

This application is a continuation of U.S. application Ser. No. 15/929,393, filed Apr. 30, 2020, which claims the benefit of priority to U.S. Provisional Application Ser. No. 62/988,078, filed on Mar. 11, 2020, which are incorporated herein by reference in their entireties.

TECHNICAL FIELD

The present disclosure relates generally to generating avatars and providing trip information.

BACKGROUND

Social network sites are some of the most popularly, if not the most popularly, visited sites on the Internet. Social networks provide a vast amount of information about users and their friends. Such information includes current status of users and their interests.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
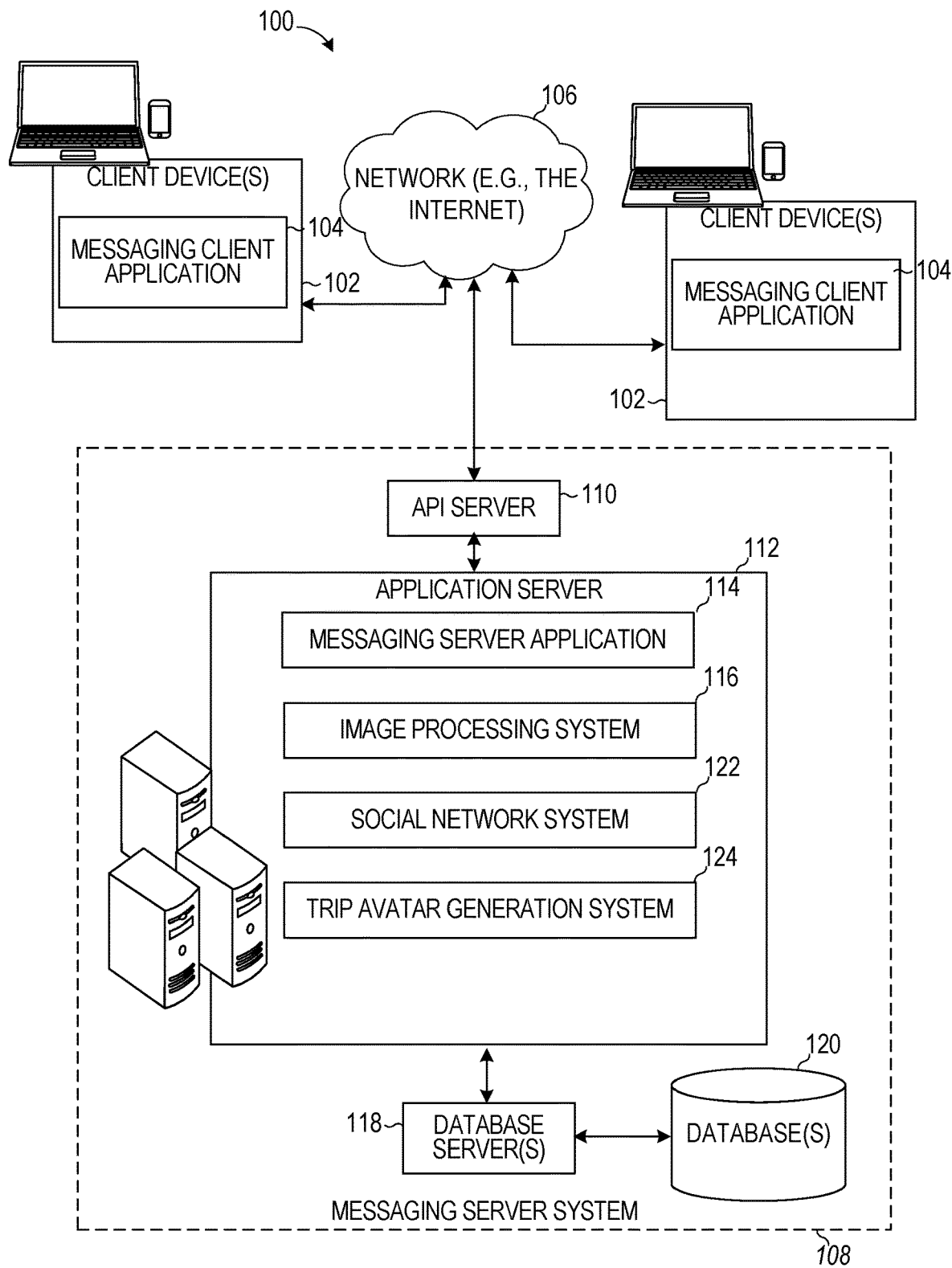
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typically, information about the recent activities various users performed is presented in an unorganized generic manner. In order to discern where a given user currently is or where the user has been, the user's friends have to navigate through a vast amount of content and various pages of information. For example, the friends have to navigate through posts made by the user and photos taken by the user to determine what the user is currently doing or where the user has recently been. While such systems work well for presenting such information, the lack of visual appeal or connection to a specific user and the need to manually navigate through multiple pages of information, makes them less attractive and less intuitive to use, which increases their overall complexity.

The disclosed embodiments improve the efficiency of using the electronic device by incorporating one or more avatars into a messaging application to visually represent a recent trip taken by a user. Specifically, according to some embodiments, various features or customizations of the one or more avatars are selected by automatically processing various content and media generated by a user while on a trip to represent the trip taken by the user. According to the disclosed embodiments, a determination is made that one or more criteria associated with a user, such as distance traveled and time spent away from a home location, correspond to a trip taken by the user during a given time interval. A plurality of media generated by a client device of the user during the given time interval is retrieved. A plurality of avatar customizations is automatically selected to represent the trip based on the plurality of media, such as an avatar flying on a plane to the destination of the trip, wearing certain clothing corresponding to the destination, and carrying a suitcase. A trip-based avatar for the user is then automatically generated based on the plurality of customizations.

By presenting to a user's friend or the user themselves with the customized avatar for a given trip recently taken by the user, the user and the user's friends are provided with a simple and intuitive interface for obtaining information about the recent trip the user took. Namely, with minimal user input, recent trip information can be visually ascertained by any given user, such as through the avatar showing someone's clothing, mode of transportation, actions, and facial expressions. This way, users do not need to navigate through a multitude of different pages of information to determine a trip information for a trip recently taken by a given user. This improves the overall efficiencies of the computing device and reduces complexities in using the messaging application.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104 and between a messaging client application 104 and the messaging server system 108 includes functions (e.g., commands to invoke functions) as well as payload data (e.g., text, audio, video, or other multimedia data).

In some embodiments, the messaging client applications 104 detects that one or more criteria of a user are indicative of a trip taken by the user. In response, the messaging client applications 104 triggers generation of an avatar to represent the trip. As an example, the messaging client applications 104 determines a home location of the user. This home location may be specified by the user or may be automatically determined based on measuring how long a user spends at the same location for a specified period of time. For example, the messaging client applications 104 determines that the user spends more than 80% of the user's time at the same home location (e.g., within a 25 mile radius of a specific GPS coordinate or address). In response, the messaging client applications 104 sets the specific GPS coordinate or address to be the home location.

The messaging client applications 104 determines that the client device 102 has left the home location. In response, the messaging client applications 104 measures how long the user spends away from the home location. The messaging client applications 104 stores one or more new destination locations corresponding to the location away from the home location. In some cases, the messaging client applications 104 begins storing the one or more destination locations when a distance between the home location and the destination locations exceeds a specified distance threshold (e.g., 60 miles). The messaging client applications 104 determines when the client device 102 has returned to the home location after spending time at the destination locations. In response to determining that the client device 102 has spent more than a specified threshold (e.g., 24 hours) at the home location after returning from the destination locations, the messaging client applications 104 determines that one or more criteria of a user are indicative of a trip taken by the user. In such cases, the messaging client applications 104 triggers generation of a trip avatar to represent the destination locations and the trip taken by the user. While certain functions are discussed as being performed by the messaging client applications 104, any one of these functions can be alternatively performed by a remote server (e.g., messaging server system 108).

In some embodiments, the messaging client applications 104 identifies a set of content or media generated by the user or the client device 102 while at the one or more destination locations. The messaging client applications 104 processes the content to generate a collection of tags that are descriptive of the content. The messaging client applications 104 ranks the collection of tags to identify a set of tags (e.g., 3 tags or less) that have a highest priority. In some cases, the messaging client applications 104 selects one tag from the collection of tags for each of a plurality of categories for inclusion in the set of tags. For example, a first tag in the collection of tags is indicative of a facial expression and is selected for inclusion in the set of tags and a second tag in the collection of tags is indicative of a mode of transportation used to reach the destinations and is selected for inclusion in the set of tags. A set of avatar customizations corresponding to the set of tags is selected and used to customize a trip avatar for presentation to the user or the user's friends. In some cases, the trip avatar is presented on a map background that indicates the one or more destinations.

In some embodiments, the messaging client applications 104 triggers generation of the trip avatar on the basis of one or more conditions being satisfied. For example, the messaging client applications 104 triggers generation of the trip avatar if the messaging client applications 104 determines that the user generated three or more media assets or content while on the trip (e.g., while the user was at the one or more destinations) and that the three or more media assets have geographical tags that are more than 30 miles away from the home location. The messaging client applications 104 may also trigger the generation of the trip avatar in response to determining that the user has returned to the home location more than 24 hours ago. In some cases, the messaging client applications 104 may find multiple trips taken by the user and in such cases, the messaging client applications 104 selects the trip for customizing the trip avatar that was taken less than 6 months ago.

In some cases, the messaging client applications 104 adds a title to a tile that includes the trip avatar. The title is automatically generated based on one or more criteria. For example, a first type of title is selected if the client device 102 returned to the home location from the one or more destinations less than two weeks ago. As another example, a second type of title is selected if the client device 102 visited multiple destinations while on the trip, where each destination is more than a threshold distance (e.g., 30 miles) from another destination and more than another threshold distance (e.g., 60 miles) from the home location. The second type of title may further be conditioned for selection on the basis of determining that more than three media assets were generated at each of the multiple destinations. In some cases, the tile that includes the trip avatar may automatically play thumbnail versions of the media assets captured by the client device 102 while visiting the one or more destinations. For example, a two second clip is generated for each video captured by the client device 102. The two second clips are automatically and sequentially displayed along with any photos that were captured while visiting the one or more destinations. A one second pause is added while presenting the photos and transitioning to another photo or video in the sequence. The media assets in the sequence transition from one to the next with a specific animation (e.g., a cross-fade animation). The sequence loops back to the beginning when the end of the sequence and the last photo or video clip is presented.

Avatar customizations for the trip avatar include avatar closing, mode of transportation, friend avatars, setting or background, text, facial expressions, or activities. As an example, the messaging client applications 104 selects a first avatar customization based on a duration of the trip (e.g., based on how long the client device 102 spent away from the home location). Specifically, if the client device 102 spent less than a week away from the home location, the messaging client applications 104 randomly selects between a plurality of avatar customizations of a first type. The first type of the plurality of avatar customizations may include an avatar wearing a briefcase or not carrying any suitcase. If the client device 102 spent more than a week away from the home location, the messaging client applications 104 randomly selects between a plurality of avatar customizations of a second type. The second type of the plurality of avatar customizations may include an avatar wearing a suitcase (a carrying case larger than the briefcase) and having a first pose (dragging the suitcase) or the avatar wearing a suitcase and having a second pose (leaning up against the suitcase).

As another example, the messaging client applications 104 selects a second avatar customization based on a distance of the trip (e.g., based on how far the client device 102 traveled away from the home location). Specifically, if the client device 102 traveled more than 400 miles away from the home location, the messaging client applications 104 randomly selects between a plurality of avatar customizations of a third type. The third type of the plurality of avatar customizations may include an avatar flying in a plane or using a first mode of transportation (plane or boat). If the client device 102 traveled less than 200 miles away from the home location, the messaging client applications 104 randomly selects between a plurality of avatar customizations of a fourth type. The fourth type of the plurality of avatar customizations may include an avatar in a car or using a second mode of transportation (car, train or bus).

The messaging client applications 104 combines the selected avatar customizations (e.g., the first avatar customization and the second avatar customization) to generate the travel avatar. For example, the messaging client applications 104 generates a travel avatar that depicts an avatar driving in a car and carrying a briefcase in the trunk in response to determining that the client device 102 traveled less than 200 miles away from the home location and that the client device 102 spent less than a week away from the home location. In some cases, the messaging client applications 104 determines that the user traveled to the one or more destinations with a friend. In such cases, the messaging client applications 104 generates a second travel avatar for the friend and includes the second travel avatar in the tile that presents the travel avatar for the user. Namely, the tile includes two travel avatars to indicate that the user traveled to the destinations with the friend and to represent the activities the friends performed while on the trip. In some cases, the messaging client applications 104 compares the weather at the one or more destinations with typical weather at the home location. If the weather differs between the travel destinations and the home location, the messaging client applications 104 customizes an article of clothing of the travel avatar to represent the weather at the travel destinations. For example, if the user lives in a tropical climate and has traveled to Canada, the messaging client applications 104 may add a parka or coat to the travel avatar to represent the colder weather at the travel destination.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the messaging server application 114, and for possible access by another messaging client application 104; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the trip avatar generation system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the trip avatar generation system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The application server 112 is communicatively coupled to a database server 118, which facilitates access to a database 120 in which is stored data associated with messages processed by the messaging server application 114.

Figure 2:
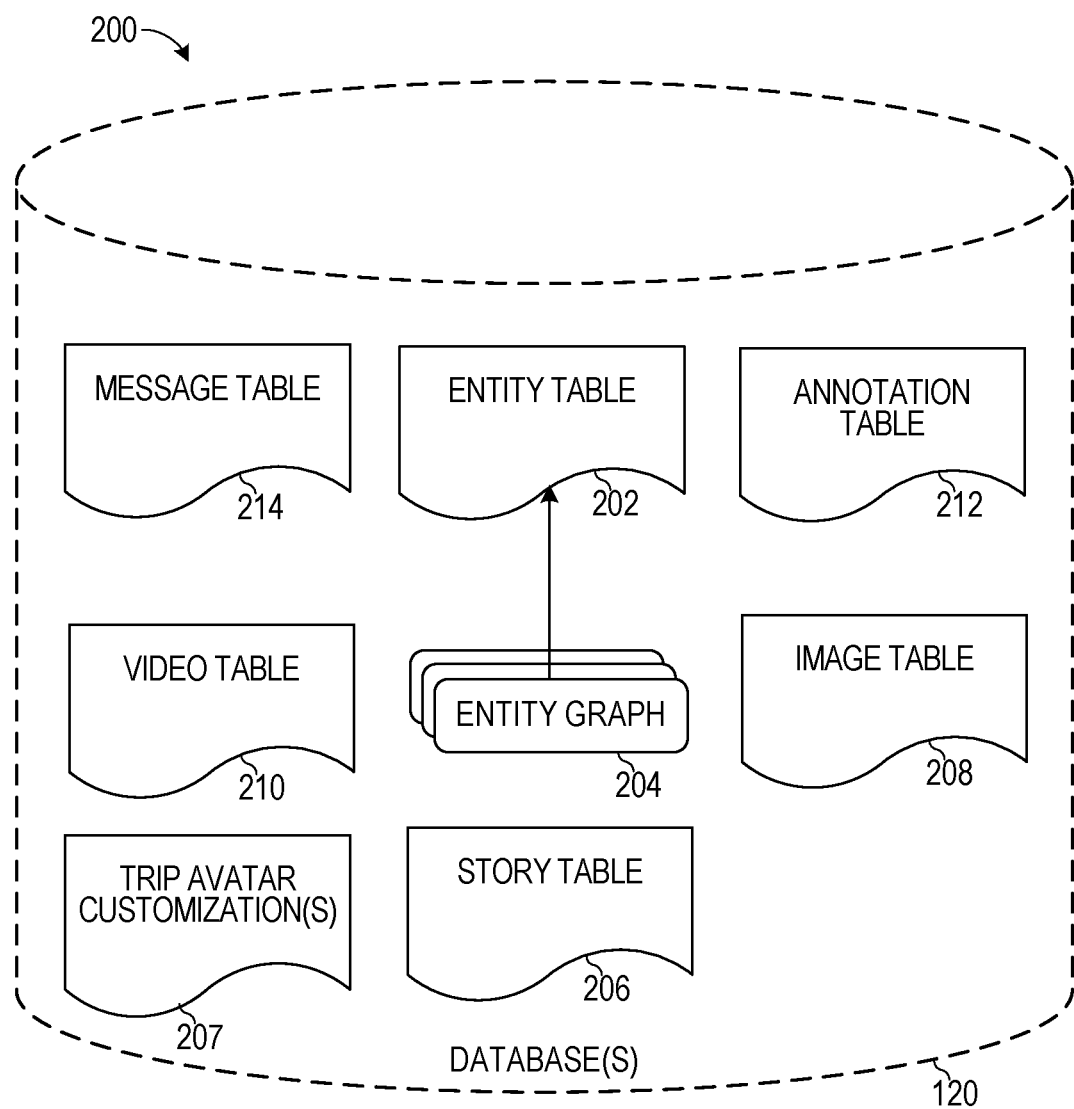
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "LENS" data. A "LENS" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Trip avatar customization(s) 207 stores avatar attributes, customizations or parameters the trip avatar generation system 124 uses to generate avatars representing different trip parameters. For example, trip avatar customization(s) 207 associates a first plurality of trip avatar customizations for a first trip criterion (e.g., if the trip was of a first duration less than a threshold) and a second plurality of trip avatar customizations for a second trip criterion (e.g., if the trip was of a second duration greater than the threshold). The trip avatar customizations may include facial expressions, animation characteristics, avatar accessories (e.g., umbrella), avatar clothing, mode of transportation, setting, activities, background and avatar poses. The trip avatar customization(s) 207 may be stored as generic instructions that are used to modify a specific avatar to depict the given set of avatar customizations. For example, a first avatar that includes features specific to a first user (e.g., hair style and skin color) may be adjusted based on a first set of trip avatar customization(s) 207 to depict a certain pose and have a certain set of clothing associated with the first set of trip avatar customization(s) 207. A second avatar that includes features specific to a second user may be adjusted based on the same first set of trip avatar customization(s) 207 to depict the same certain pose and have the same certain set of clothing associated with the first set of avatar trip avatar customization(s) 207 as the first avatar while maintaining the features that are unique to the second user.

Each avatar customization in the trip avatar customization(s) 207 may be associated with one or more tags. As the trip avatar generation system 124 generates or retrieves tags for different media generated by the client device 102 while on the trip, the trip avatar generation system 124 can select the specific avatar customization that is associated with the generated or retrieved tag. In some cases, multiple avatar customizations may be associated with the same tag. In such cases, the trip avatar generation system 124 selects randomly one of the multiple avatar customizations that are associated with the same tag. In some cases, a given avatar customization tag may be associated with a rarity factor indicating how rare the specific tag is to be encountered. For example, a spaceship may be associated with a maximum rarity factor because flying on a spaceship is an extremely rare activity while eating may be associated with the lowest rarity factor because eating is a commonly done activity. Using the rarity factor computed for the media captured or generated by the client device 102 while on the trip, the trip avatar generation system 124 selects a given trip avatar customization 207 that is associated with the highest rarity factor for use in modifying the trip avatar.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
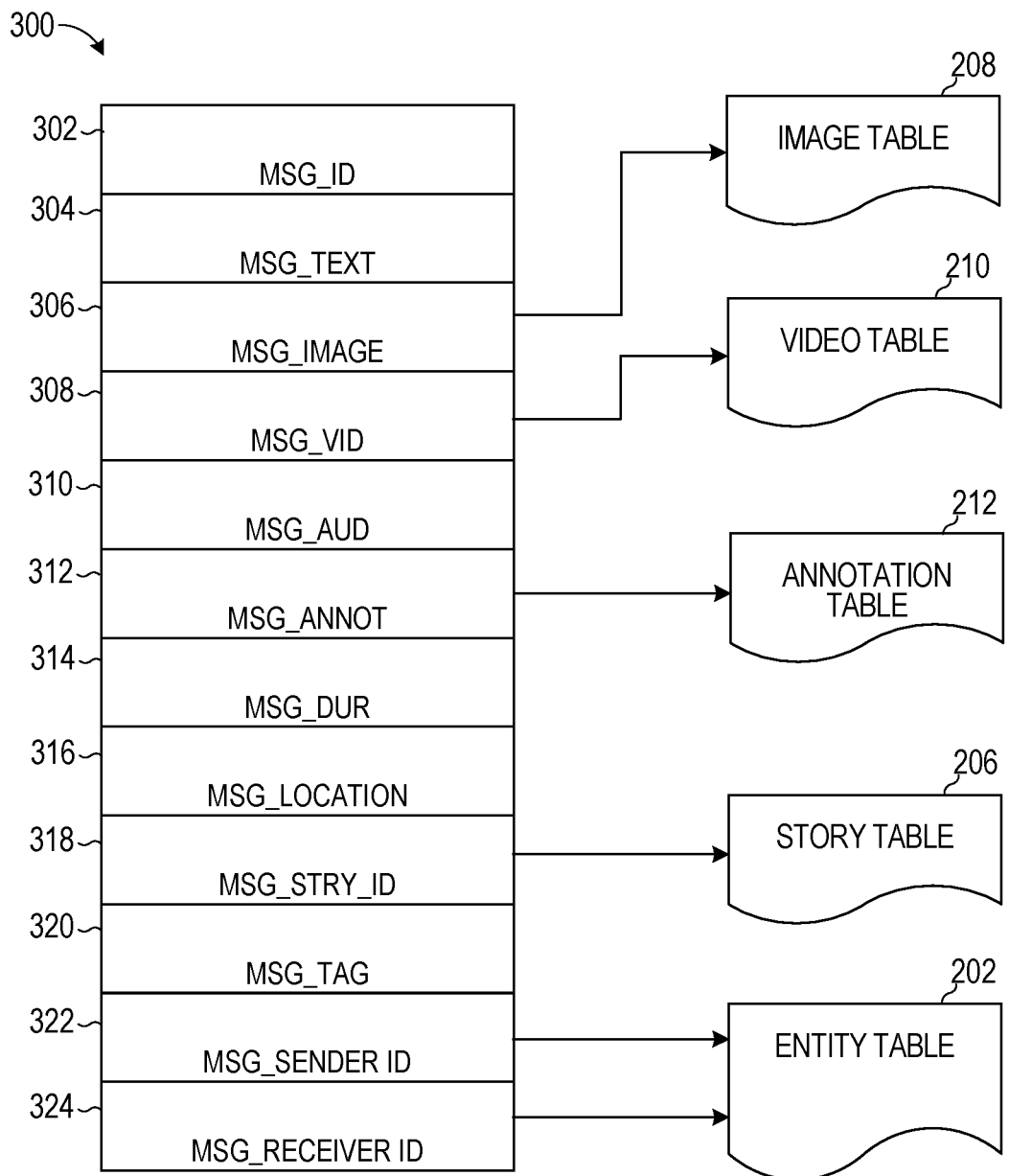
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
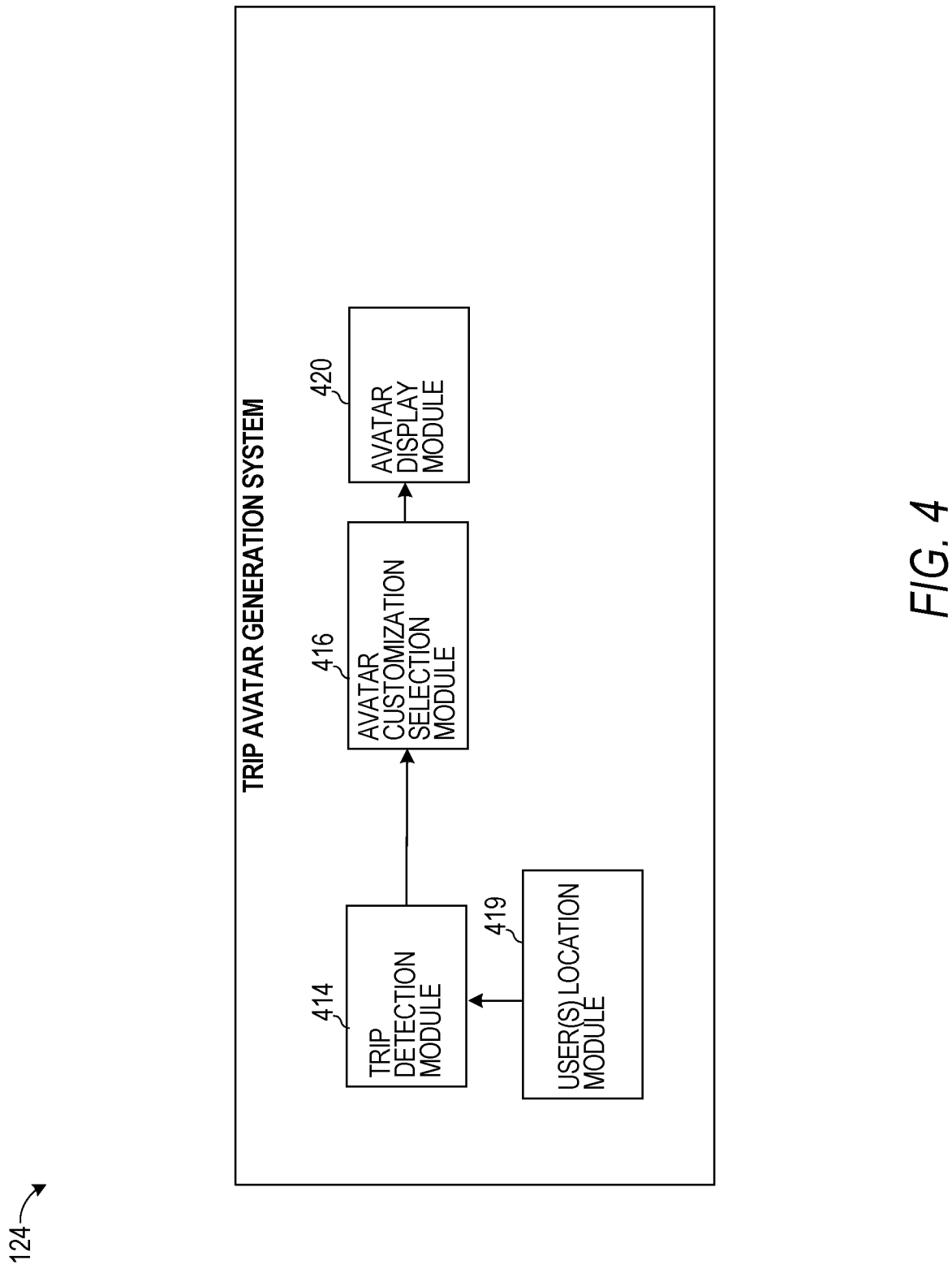
FIG. 4 is a block diagram showing an example trip avatar generation system, according to example embodiments.

FIG. 4 is a block diagram showing an example trip avatar generation system 124, according to example embodiments. Trip avatar generation system 124 includes a trip detection module 414, a user(s) location module 419, an avatar customization selection module 416, and an avatar display module 420.

User(s) location module 419 accesses a GPS system of the client device 102 for a given user to determine the geographical location of the client device 102. The user location module 419 identifies a home location of the client device 102 by identifying a geographical location that the client device 102 is in for a majority of the time (e.g., more than 80% of the time). In some cases, the user location module 419 receives user input that specifies the home location by providing the address or GPS location of the home address. The user location module 419 generates a radius (e.g., 25 miles) around the home location. The user location module 419 determines when the client device 102 leaves the radius of the home location and in response marks the new locations as a potential travel destination. The user location module 419 measures how long the client device 102 spends away from the home location at one or more potential travel destinations. The user location module 419 stores the destination locations of each potential travel destination along with the time stamps when the potential travel destinations were visited by the client device 102.

Trip detection module 414 processes the data from the user location module 419 to determine when a given trip a user has taken began and ended. For example, the trip detection module 414 determines a starting time of when the client device 102 left the home location and an ending time of when the client device 102 returned to the home location. If the difference between the starting time and the ending time exceeds a threshold (e.g., more than 2 days), the trip detection module 414 determines that the client device 102 was on a trip between the starting time and the ending time. The trip detection module 414 determines whether the client device has stayed at the home location for more than a threshold period of time (e.g., more than 24 hours) after returning to the home location. In response, the trip detection module 414 may trigger generation of a trip avatar to represent the trip taken by the user between the starting time and the ending time.

The trip detection module 414 determines one or more parameters of the trip. For example, the trip detection module 414 determines weather at the destinations visited away from the home location. The trip detection module 414 determines if the weather at the destinations differs from the weather at the home location. If so, the trip detection module 414 instructs the avatar customization selection module 416 to select an avatar customization to represent the weather at the destinations.

The trip detection module 414 determines a distance between the home location and the travel destinations. For example, the trip detection module 414 determines whether the distance between the home location and the travel destinations exceeds a specified threshold (e.g., 400 miles). If so, the trip detection module 414 instructs the avatar customization selection module 416 to select an avatar customization to represent a first mode of transportation (e.g., a plane). Otherwise, if the distance is less than the specified threshold but more than another threshold (e.g., 60 miles), the trip detection module 414 instructs the avatar customization selection module 416 to select an avatar customization to represent a second mode of transportation (a car).

The trip detection module 414 determines how long the client device 102 was on the trip based on a difference between the start and end time of the trip. For example, the trip detection module 414 determines whether the duration of the trip exceeds a threshold (e.g., 2 weeks). If so, the trip detection module 414 instructs the avatar customization selection module 416 to select an avatar customization to represent a first type of carrying case (e.g., a suitcase). Otherwise, if the trip duration is less than the threshold, the trip detection module 414 instructs the avatar customization selection module 416 to select an avatar customization to represent a second type of carrying case (e.g., a briefcase).

In some embodiments, the trip detection module 414 retrieves media (e.g., posts to a social network, messages exchanged between users, videos, and images) generated by the client device 102 while the client device 102 was away from the home location and on the trip. For example, the trip detection module 414 retrieves a collection of media generated by the client device 102 between the start time and end time of the trip. The trip detection module 414 processes the media to generate a plurality of tags (e.g., metadata that is descriptive of each media asset). The trip detection module 414 ranks the plurality of tags based on one or more criteria (e.g., frequency of occurrence, rarity factor, user preferences, importance, and so forth). The trip detection module 414 selects a subset of the ranked plurality of tags (e.g., selects tags associated with a rank that exceeds a threshold). The trip detection module 414 provides the selected subset of ranked tags to the avatar customization selection module 416. The avatar customization selection module 416 selects a combination of avatar customizations that correspond to the selected subset of ranked tags. In some cases, the trip detection module 414 determines that one of the tags associated with the media corresponds to a rare event or activity (e.g., has a rarity factor that exceeds a threshold). In such circumstances, the trip detection module 414 associates a highest rank to this tag to ensure that the tag is used to select an avatar customization. For example, if the trip detection module 414 determines that the client device 102 generated content that is associated with space travel, the trip detection module 414 generates a space travel activity tag indicative of space travel and associates a maximum rank to this tag as space travel is associated with a very high rarity factor that exceeds a threshold. In this case, the avatar customization selection module 416 generates an avatar that appears to be on a spaceship to represent the space travel activity tag.

The trip detection module 414 selects and ranks tags on the basis of how many media assets are associated with the same tag. Certain tags are selected for inclusion in the subset that is used to customize the avatar if a certain quantity of media assets is generated and is associated with the same tag. If less than a threshold quantity of media assets is associated with the same tag, the particular tag is not included in the subset that is used to select an avatar customization. For example, the trip detection module 414 determines a first number of the plurality of media associated with a same first tag of the plurality of tags and determines a second number of the plurality of media associated with a same second tag of the plurality of tags. The trip detection module 414 selects a first customization of the plurality of avatar customizations associated with the same first tag in response to determining that the first number exceeds a first minimum threshold value. The trip detection module 414 selects a second customization of the plurality of avatar customizations associated with the same second tag in response to determining that the second number exceeds a second minimum threshold value. The second minimum threshold value may be greater than the first minimum threshold value.

As an example, the trip detection module 414 may identify 15 different pictures of food that were taken while the client device 102 was on the trip and 3 pictures of a sail boat. The trip detection module 414 may determine that a food tag is associated with the pictures of food and that a rare activity tag is associated with the sail boat. The trip detection module 414 may further determine that the food tag is associated with a minimum quantity of 35 and that the rare activity tag is associated with a minimum quantity of 2. In this case, the trip detection module 414 may cause the avatar customization selection module 416 to select a customization that represents the sail boat activity because the 3 pictures taken of the sail boat exceeds the minimum quantity of 2. The trip detection module 414 may prevent the avatar customization selection module 416 from selecting a customization that represents food because the 15 pictures of food does not exceed the minimum quantity of 35. The minimum quantities may be adjusted based on user preferences. So if a given user never takes pictures of food but often rides sail boats, the minimum quantity of the food tag may be decreased to 3 and the minimum quantity of the rare activity tag may be increased to 10. In this way, the trip detection module 414 instructs the avatar customization selection module 416 to select avatar customizations that represent the most important and memorable events that the user encountered while on the trip.

The trip detection module 414 determines whether one or more other users were together with the user on the trip. For example, the trip detection module 414 accesses location information for friends of the user. The trip detection module 414 determines whether the location information for the friends overlaps in time and place with the destination locations that the client device 102 was in between the start and end time of the trip. If so, the trip detection module 414 determines that the friends were on the same trip with the user. In some cases, the trip detection module 414 generates a notification or prompt requesting the user to confirm that the friends were on the same trip. In response to determining that the friends were on the same trip, the trip detection module 414 generates a travel avatar for the friends and includes the travel avatar for the friends in the same display as the travel avatar for the user.

The trip detection module 414 determines various activities the user performed while on the trip based on the tags associated with the media generated by the client device 102 while on the trip. The trip detection module 414 ranks the activities and selects the tag associated with the highest ranked activity for selection of an avatar customization.

Avatar display module 420 retrieves an avatar for the user associated with the client device 102. The avatar display module 420 adjusts the avatar for the user based on a combination of avatar customization received from the avatar customization selection module 416. The avatar display module 420 retrieves a map corresponding to the travel destinations of the client device 102. The avatar display module 420 adds the travel avatar with the modified customizations to the map to create an interactive tile that represents the trip. The tile may be presented to the user of the client device 102 or to friends of the user. The tile may be selected to access a set of media captured by the client device 102 while on the trip and to share the media with one or more other users. In some cases, the tile includes multiple avatars if more than one user was on the same trip. Namely, the avatar display module 420 may include a first travel avatar for the user of the client device 102 and a second travel avatar for a friend of the user that was on the same trip as the user.

Figure 5:
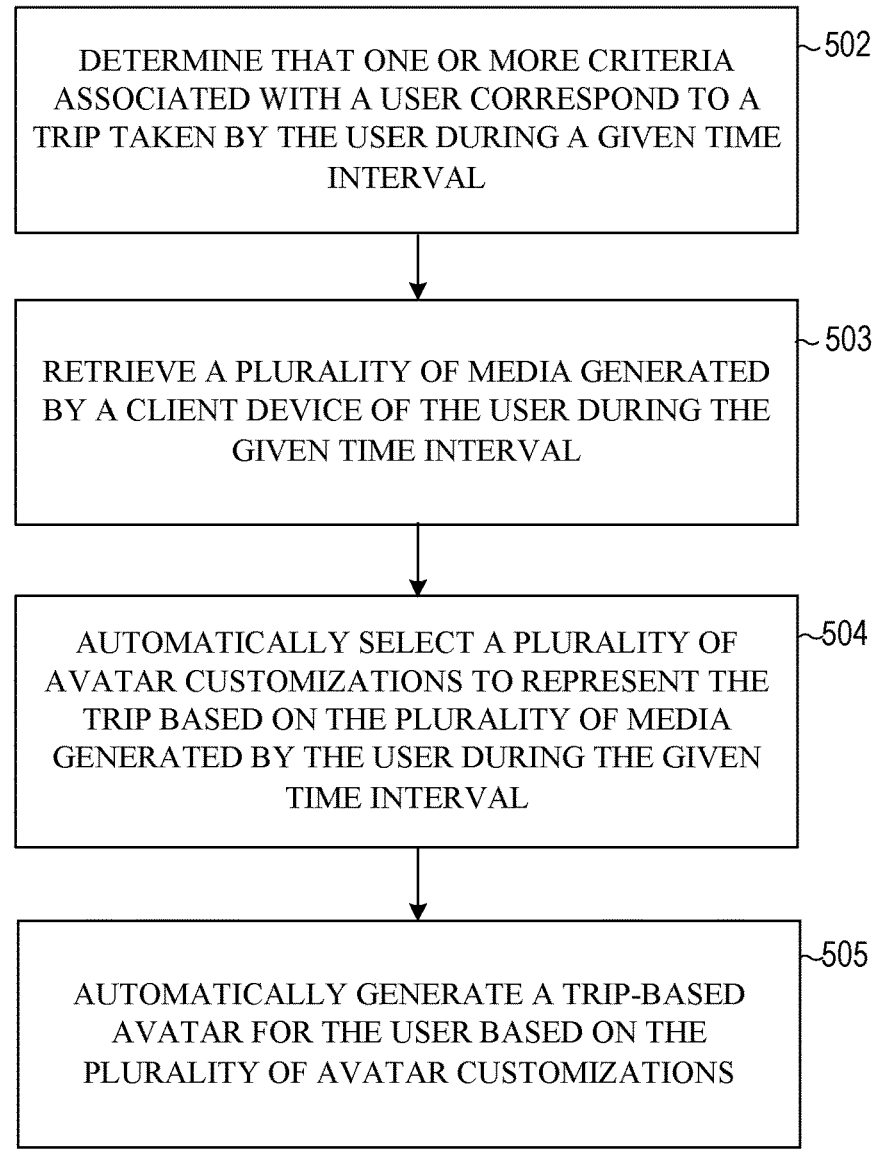
FIG. 5 is a flowchart illustrating example operations of the trip avatar generation system, according to example embodiments.

FIG. 5 is a flowchart illustrating example operations of the trip avatar generation system 124 in performing process 500, according to example embodiments. The process 500 may be embodied in computer-readable instructions for execution by one or more processors such that the operations of the process 500 may be performed in part or in whole by the functional components of the messaging server system 108; accordingly, the process 500 is described below by way of example with reference thereto. However, in other embodiments, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

At operation 502, the trip avatar generation system 124 determines that one or more criteria associated with a user correspond to a trip taken by the user during a given time interval. For example, the trip avatar generation system 124 compares a distance traveled by a client device away from a home location and time spent away from the home location to a threshold. If the distance traveled exceeds the threshold and the time spent exceeds a time threshold, the trip avatar generation system 124 determines that one or more criteria associated with the user correspond to a trip taken by the user.

At operation 503, the trip avatar generation system 124 retrieves a plurality of media generated by a client device of the user during the given time interval. For example, the trip avatar generation system 124 obtains videos, comments, images, and so forth generated by the user using the client device 102 during the time interval corresponding to the trip. The trip avatar generation system 124 selects the media by analyzing time stamps of the media assets and verifying that the time stamps are within the trip time interval.

At operation 504, the trip avatar generation system 124 automatically selects a plurality of avatar customizations to represent the trip based on the plurality of media generated by the user during the given time interval. For example, the trip avatar generation system 124 selects a briefcase rather than a suitcase if the trip lasted a first amount of time that exceeds a threshold. The trip avatar generation system 124 also selects an airplane rather than a car as the avatar customization if the client device 102 traveled over a certain threshold distance from a home location.

At operation 505, the trip avatar generation system 124 automatically generates a trip-based avatar for the user based on the plurality of avatar customizations. For example, as shown in FIG. 6, trip avatar generation system 124 presents a tile that includes a map representing a destination of a trip previously taken by a user and a travel avatar 610.

In some embodiments, the trip avatar generation system 124 generates an avatar that collectively represents media captured by a client device 102. Specifically, the trip avatar generation system 124 selects a group of media assets (e.g., media assets captured by a given client device 102 at a particular location, within a particular time interval, or shared with particular users). The trip avatar generation system 124 then selects a plurality of avatar customizations to the group of media assets and automatically generates an avatar for the user based on the plurality of avatar customizations. In this example, rather than the avatar being specific to a trip taken by a user, the avatar represents an event associated with the user by modifying a plurality of customizations of the avatar, each customization associated with a different attribute determined from the group of media assets.

Figure 6:
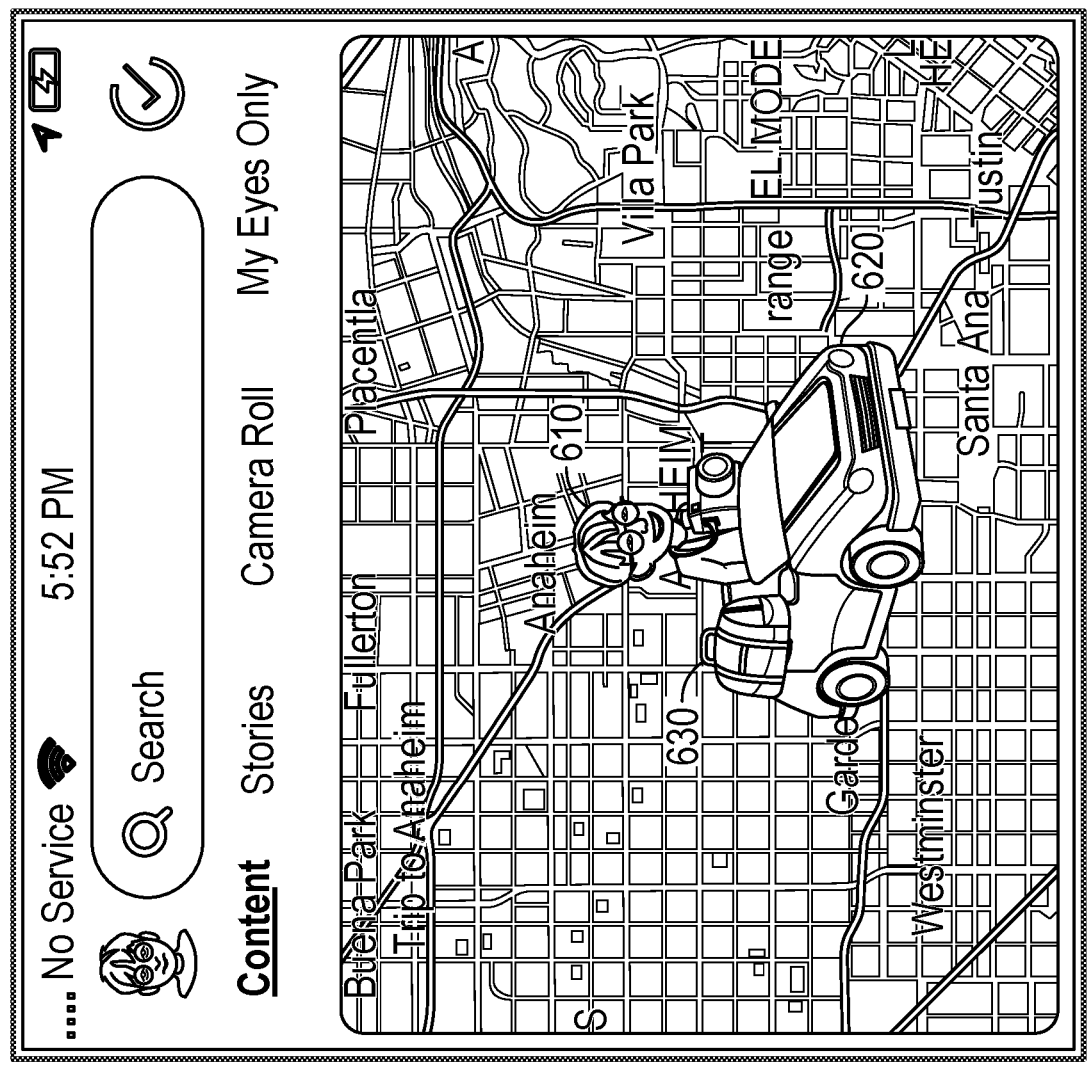
FIGS. 6-8 are illustrative inputs and outputs of the trip avatar generation system, according to example embodiments.
Figure 7:
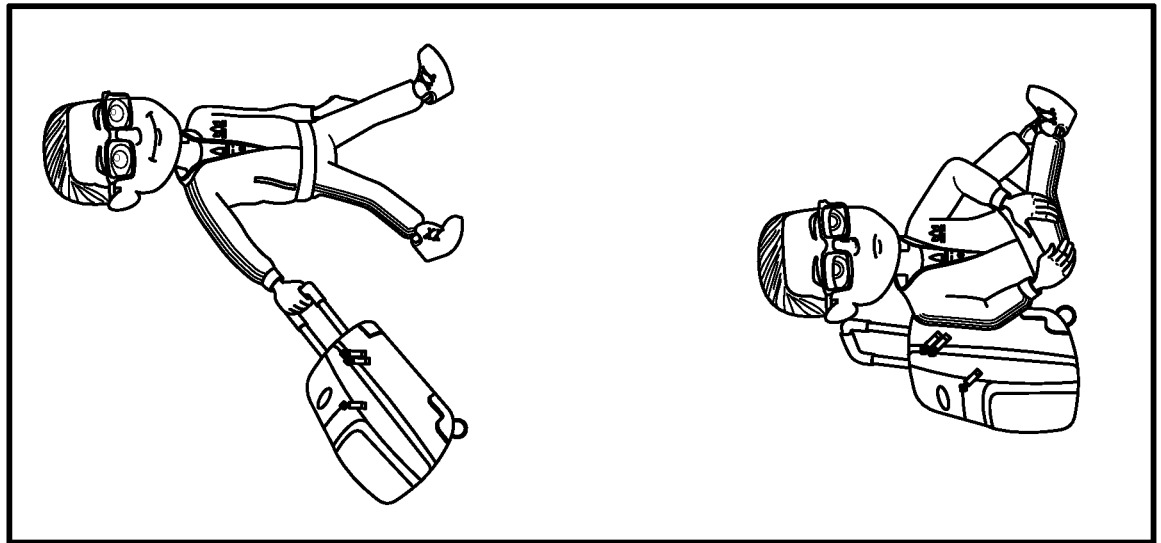
Figure 7:
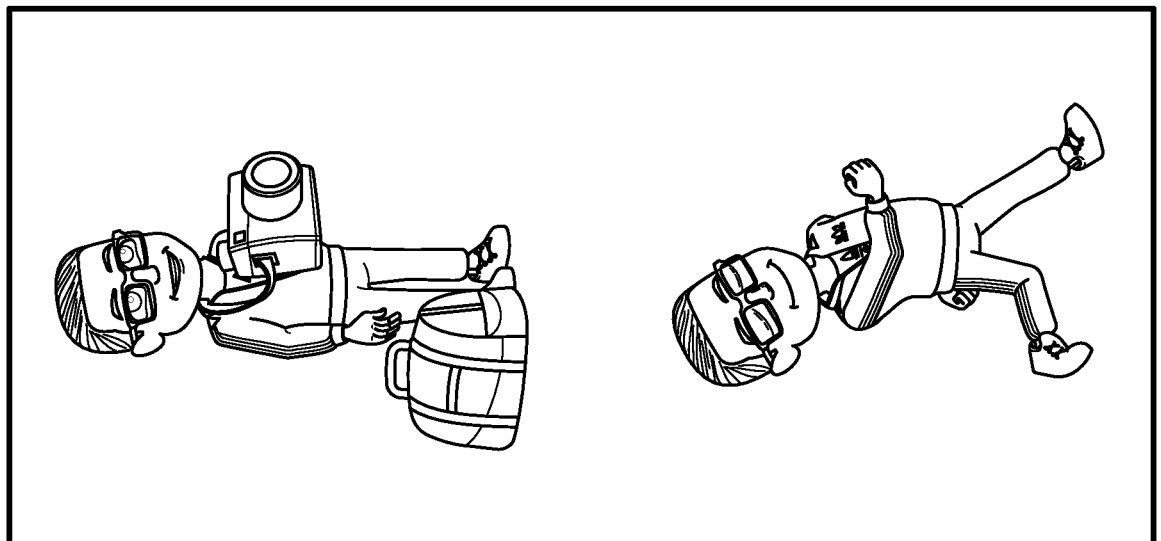
Figure 8:
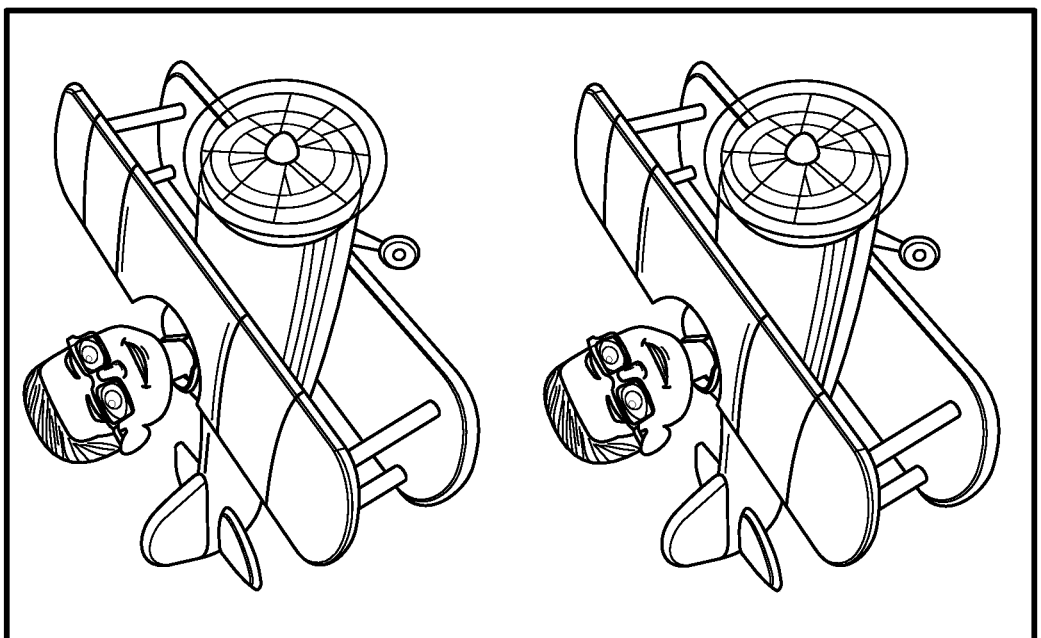
Figure 8:
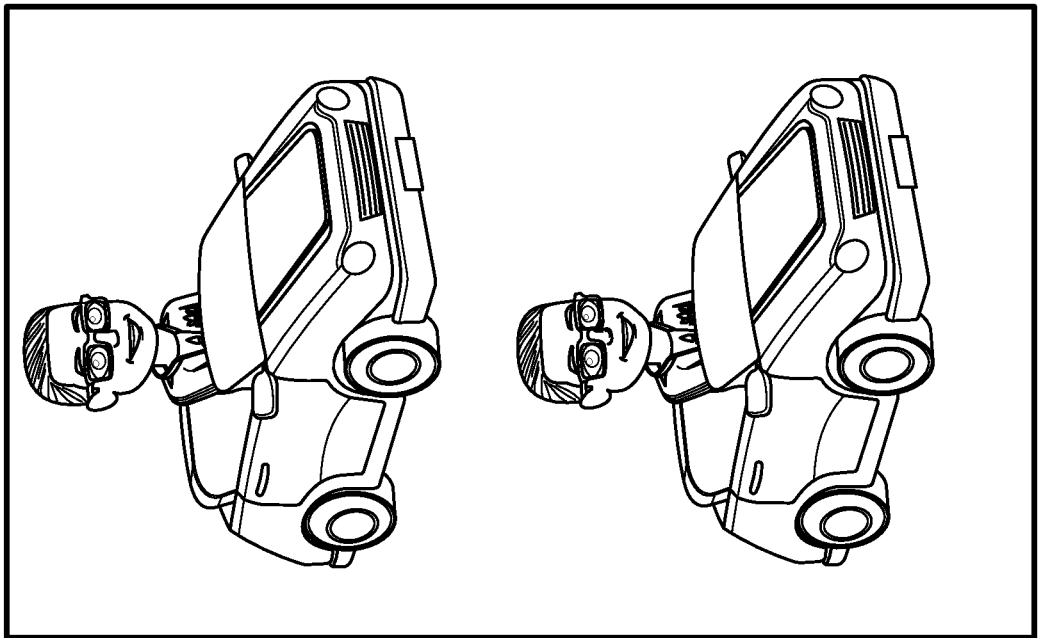

FIGS. 6-8 show illustrative inputs and outputs of the trip avatar generation system 124, according to example embodiments. As shown in FIG. 6, trip avatar generation system 124 presents a tile that includes a map representing a destination of a trip previously taken by a user and a travel avatar 610. The tile may be generated and presented by the trip avatar generation system 124 in response to determining that the trip was taken more than 24 hours ago. For example, the tile may be generated in response to determining that the client device 102 returned to the home location and remained at the home location for more than 24 hours after visiting the travel destinations.

The trip avatar generation system 124 customizes the travel avatar 610 with a combination of avatar customizations. For example, the trip avatar generation system 124 presents a facial expression of the travel avatar 610 as being happy because the trip avatar generation system 124 determines that the user was excited most of the time while on the trip based on the media captured by the client device 102 while on the trip. For example, the trip avatar generation system 124 may isolate and analyze facial expressions in the media captured by the client device 102 and map each facial expression to a corresponding mood. The trip avatar generation system 124 identifies a majority of the moods that are mapped to the facial expressions as being happy and in response determines that the user was excited most of the time while on the trip. In some cases, the trip avatar generation system 124 computes an average happiness score for each of the media captured by the client device 102 and if the average happiness score of all the media captured by the client device 102 while on the trip exceeds a given threshold or if a proportion of media with a happiness score exceeds a threshold, then the trip avatar generation system 124 determines that the user was excited for most of the time during the trip.

The trip avatar generation system 124 presents a carrying case 630 that is a briefcase as another avatar customization because the trip avatar generation system 124 determines that the trip lasted less than two weeks. For example, the trip avatar generation system 124 selects between two different types of carrying case avatars, shown in FIG. 7. A first type of carrying case avatars 710 corresponds to trips that last less than a threshold period of time. The first type of carrying case avatars 710 includes a first avatar carrying a briefcase and a second avatar not carrying any carrying case. The trip avatar generation system 124 selects randomly between the first and second avatars of the first type of carrying case avatars 710 in response to determining that the trip lasted less than the threshold period of time. A second type of carrying case avatars 720 corresponds to trips that last more than the threshold period of time. The second type of carrying case avatars 720 includes a first avatar carrying a suitcase (larger than the briefcase) and in a first pose (walking) and a second avatar carrying the suitcase and in a second pose (leaning against the suitcase). The trip avatar generation system 124 selects randomly between the first and second avatars of the second type of carrying case avatars 720 in response to determining that the trip lasted more than the threshold period of time.

The trip avatar generation system 124 presents the avatar using a car 620 as a mode of transportation in response to determining that the distance between the destinations and the home location exceeds a first threshold (e.g., 60 miles) but is less than a second threshold (e.g., 400 miles). For example, the trip avatar generation system 124 selects between two different types of mode of transportations, shown in FIG. 8. A first type of mode of transportation avatars 810 corresponds to trips that are more than a threshold distance away from the home location. The first type of mode of transportation avatars 810 includes a first avatar flying a plane of a first type and a second avatar flying a plane of a second type. The trip avatar generation system 124 selects randomly between the first and second avatars of the first type of mode of transportation avatars 810 in response to determining that the trip was more than a threshold distance away from the home location. A second type of mode of transportation avatars 820 corresponds to trips that are less than the threshold distance to the home location. The second type of mode of transportation avatars 820 includes a first avatar driving a car of a first type and a second avatar driving a car of a second type (or in a train or bus). The trip avatar generation system 124 selects randomly between the first and second avatars of the second type of mode of transportation avatars 820 in response to determining that the trip was less than the threshold distance away from the home location.

Figure 9:
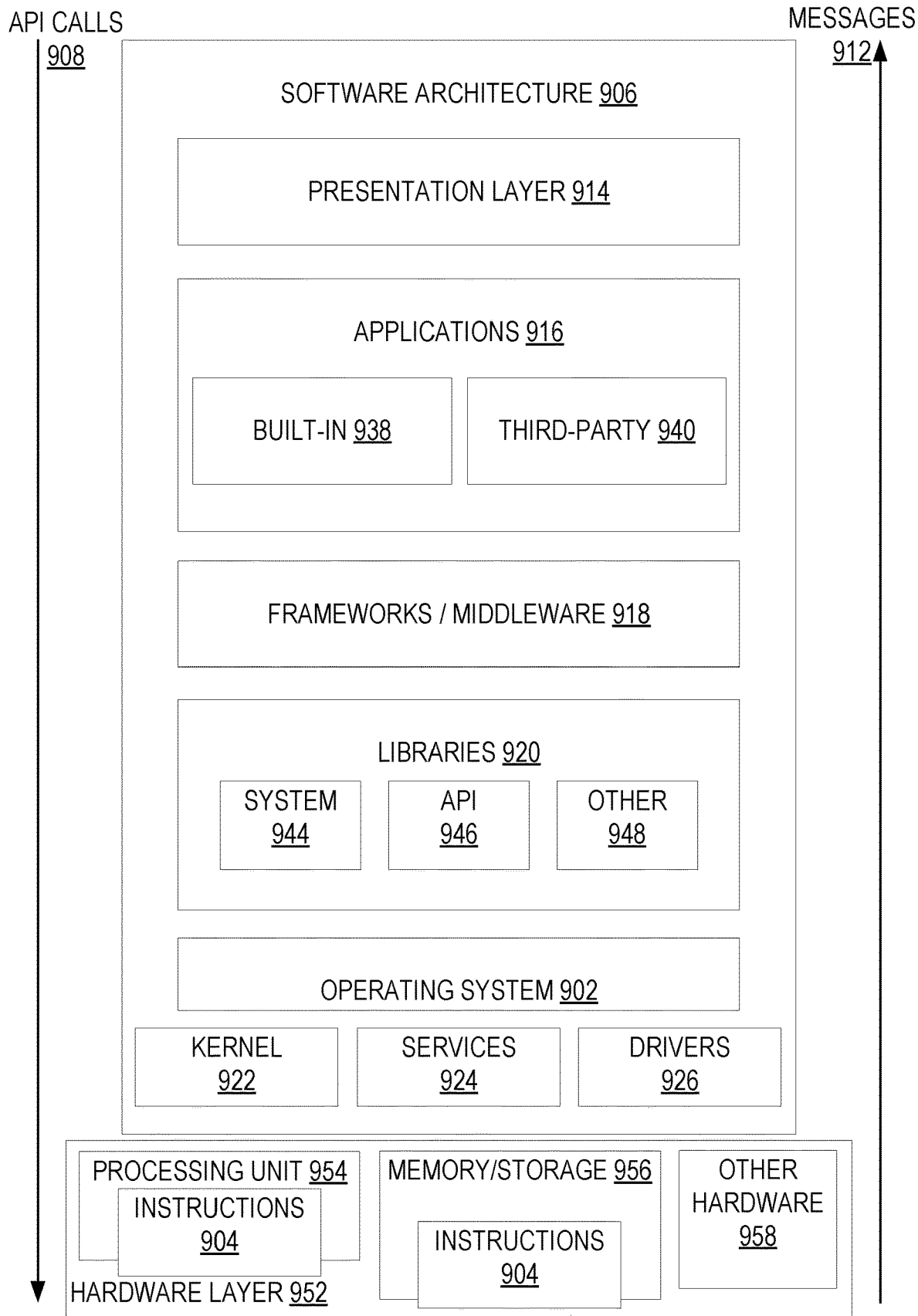
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and input/output (I/O) components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic UI (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
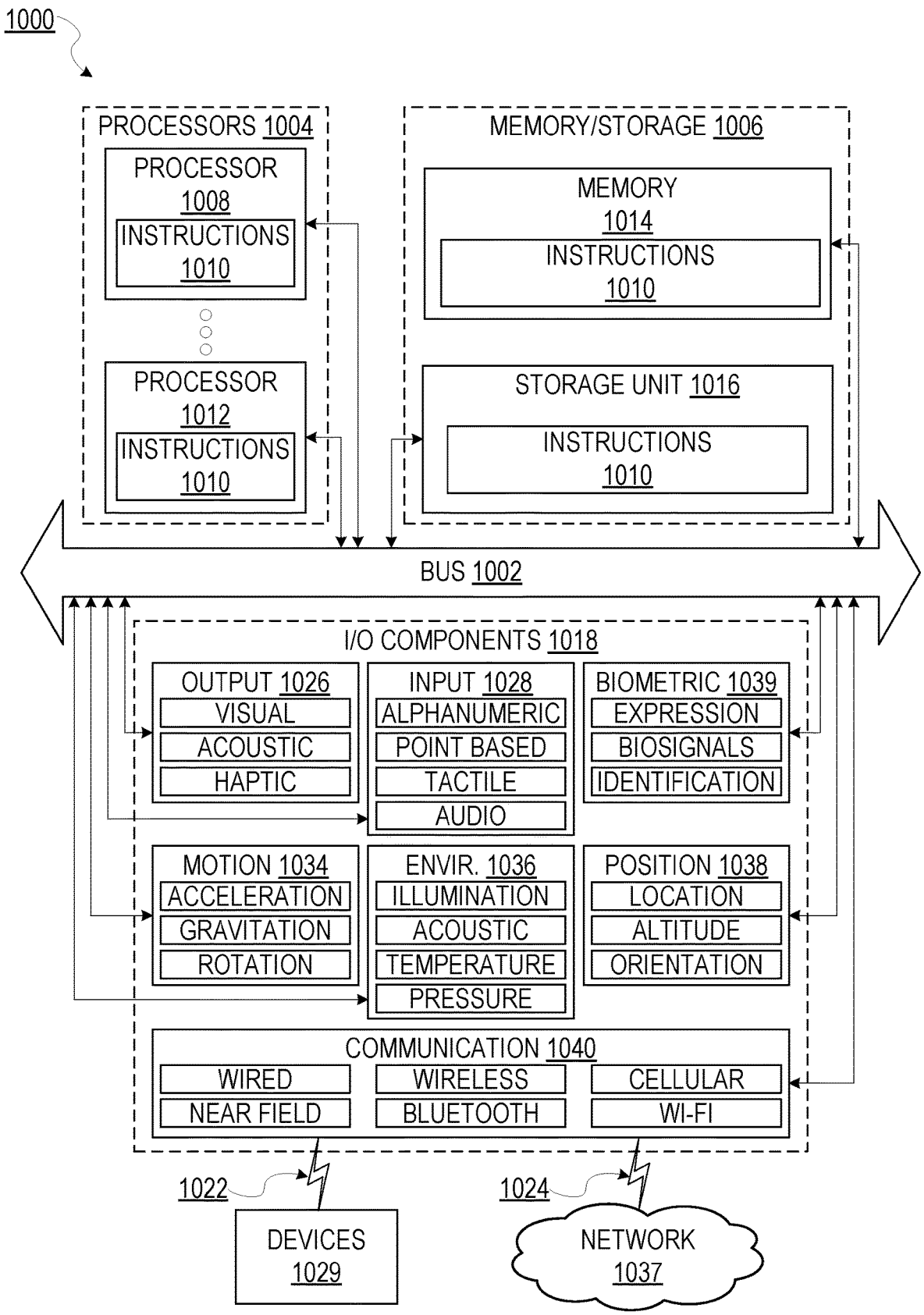
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors (sometimes referred to as "cores") that may execute instructions contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1039, motion components 1034, environmental components 1036, or position components 1038 among a wide array of other components. For example, the biometric components 1039 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1037 or devices 1029 via coupling 1024 and coupling 1022, respectively. For example, the communication components 1040 may include a network interface component or other suitable device to interface with the network 1037. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1029 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code,", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   automatically selecting a plurality of avatar customizations based on a plurality of media captured during a given time interval;
   selecting a first customization of the plurality of avatar customizations associated with a first attribute in response to determining that a first number of the plurality of media associated with the first attribute exceeds a first minimum threshold value;
   selecting a second customization of the plurality of avatar customizations associated with a second attribute in response to determining that a second number of the plurality of media associated with the second attribute exceeds a second minimum threshold value that is greater than the first minimum threshold value;
   computing a distance between a destination of a trip associated with the plurality of media and a home location of a client device; and
   in response to determining that the distance exceeds a distance threshold, selecting the second customization based on the distance between the destination of the trip and the home location, such that the second customization is of a first type based on the distance being more than the distance threshold and is of a second type based on the distance being less than the distance threshold.

2. The method of claim 1, further comprising:
   retrieving the plurality of media generated by the client device during a given time interval corresponding to a trip; and
   in response to determining that a specified period of time has passed since the client device has returned to the home location after being at a different location, automatically generating an avatar based on the plurality of avatar customizations corresponding to the first and second customizations.

3. The method of claim 1, further comprising:
   obtaining location information for the plurality of media;
   determining the home location; and
   determining that a travel location indicated by the location information is spaced from the home location by more than a threshold distance.

4. The method of claim 1, further comprising:
   determining that the client device has been at a different location than the home location for more than a specified threshold; and
   generating a given time interval based on a first time at which the client device has left the home location and a second time at which the client device returned to the home location.

5. The method of claim 4, further comprising:
   determining a duration of time spent on a trip based on the given time interval; and
   selecting the first customization based on the duration of time spent on the trip, such that the first customization is of a third type based on the duration of time spent on the trip being more than a specified amount and is of a fourth type based on the duration of time spent on the trip being less than the specified amount.

6. The method of claim 5, wherein the third type of customization comprises a first type of suitcase and the fourth type of customization comprises a second type of suitcase.

7. The method of claim 5, further comprising randomly selecting between the plurality of avatar customizations of the third type for use as the first customization based on the duration of time spent on the trip being more than the specified amount.

8. The method of claim 5, further comprising generating a title for an avatar based on a quantity of destinations visited during the trip.

9. The method of claim 1, further comprising:
   determining a destination of the trip based on the plurality of media.

10. The method of claim 1, further comprising randomly selecting between the plurality of avatar customizations of the first type for use as the second customization based on the distance being more than the distance threshold.

11. The method of claim 1, further comprising randomly selecting between the plurality of avatar customizations of the second type for use as the second customization based on the distance being less than the distance threshold.

12. The method of claim 1, wherein the second customization comprises a mode of transportation to the destination from the home location, and wherein the first type of customization comprises an airplane and the second type of customization comprises a car.

13. The method of claim 1, further comprising:
comparing weather at the destination of the trip to weather at the home location of the client device; and
in response to determining that the weather at the destination differs from the weather at the home location, selecting the second customization based on the weather at the destination.

14. The method of claim 1, further comprising:
generating a plurality of attributes based on the plurality of media.

15. The method of claim 14, further comprising:
ranking the plurality of attributes; and
selecting a subset of the plurality of attributes having a rank that exceeds a specified value, wherein the plurality of avatar customizations is selected based on the subset of the plurality of attributes.

16. The method of claim 1, further comprising:
determining a duration of time that has elapsed since the client device has returned to the home location after being at a different location; and
generating a title for an avatar based on the duration of time that has elapsed since the client device has returned to the home location after being at the different location.

17. The method of claim 1, further comprising:
determining an activity performed on a trip based on a plurality of attributes; and
increasing rank associated with the activity in response to determining that the activity is different than other activities.

18. A system comprising:
at least one processor programmed to perform operations comprising:
automatically selecting a plurality of avatar customizations based on a plurality of media captured during a given time interval;
selecting a first customization of the plurality of avatar customizations associated with a first attribute in response to determining that a first number of the plurality of media associated with the first attribute exceeds a first minimum threshold value;
selecting a second customization of the plurality of avatar customizations associated with a second attribute in response to determining that a second number of the plurality of media associated with the second attribute exceeds a second minimum threshold value that is greater than the first minimum threshold value;
computing a distance between a destination of a trip associated with the plurality of media and a home location of a client device; and
in response to determining that the distance exceeds a distance threshold, selecting the second customization based on the distance between the destination of the trip and the home location, such that the second customization is of a first type based on the distance being more than the distance threshold and is of a second type based on the distance being less than the distance threshold.

19. The system of claim 18, the operations further comprising:
retrieving the plurality of media generated by the client device during a given time interval corresponding to a trip; and
in response to determining that a specified period of time has elapsed since the client device has returned to the home location after being at a different location, automatically generating an avatar based on the plurality of avatar customizations corresponding to the first and second customizations.

20. A non-transitory machine-readable storage medium that includes instructions that, when executed by one or more processors of a machine, cause the machine to perform operations comprising:
automatically selecting a plurality of avatar customizations based on a plurality of media captured during a given time interval;
selecting a first customization of the plurality of avatar customizations associated with a first attribute in response to determining that a first number of the plurality of media associated with the first attribute exceeds a first minimum threshold value;
selecting a second customization of the plurality of avatar customizations associated with a second attribute in response to determining that a second number of the plurality of media associated with the second attribute exceeds a second minimum threshold value that is greater than the first minimum threshold value;
computing a distance between a destination of a trip associated with the plurality of media and a home location of a client device; and
in response to determining that the distance exceeds a distance threshold, selecting the second customization based on the distance between the destination of the trip and the home location, such that the second customization is of a first type based on the distance being more than the distance threshold and is of a second type based on the distance being less than the distance threshold.

* * * * *